Feb. 6, 1945.　　　　N. E. HART　　　　2,368,984
POISE
Filed Dec. 24, 1942
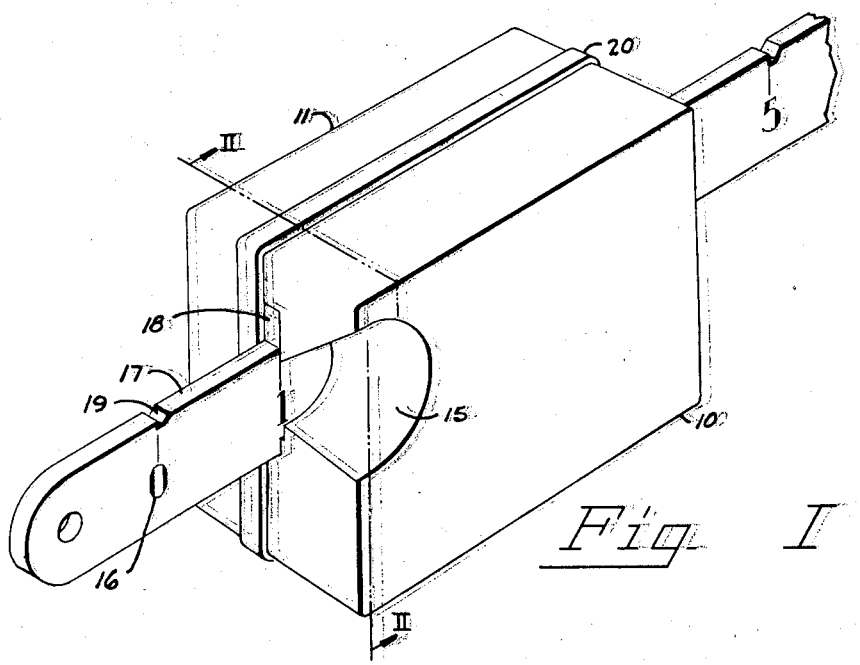
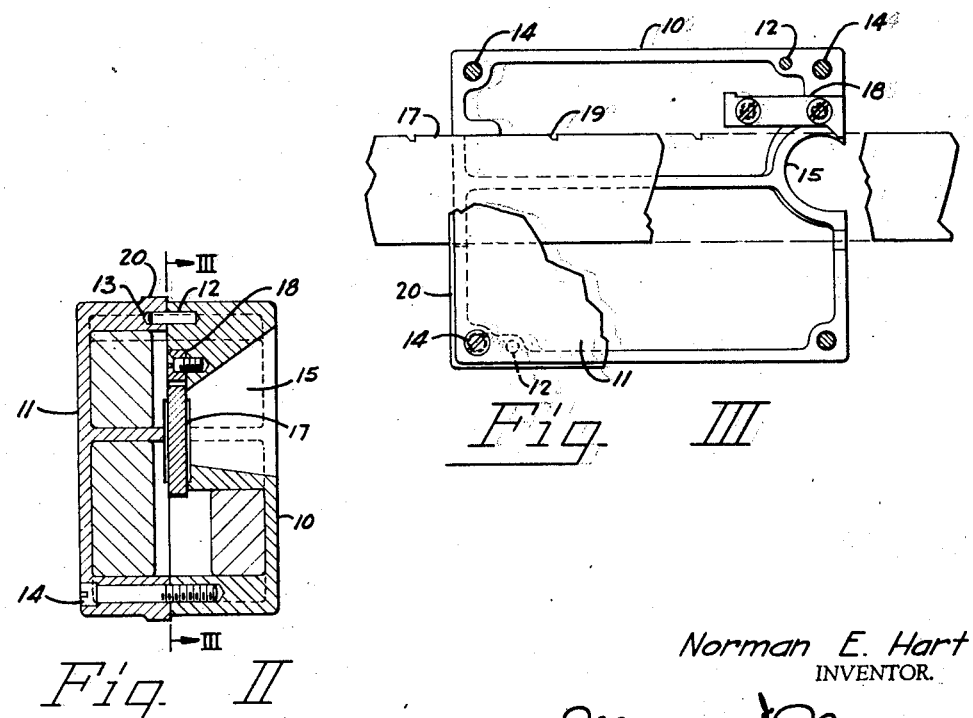
Norman E. Hart
INVENTOR.
BY Marshall & Marshall
ATTORNEYS Patented Feb. 6, 1945

2,368,984

UNITED STATES PATENT OFFICE 2,368,984

POISE

Norman E. Hart, Toledo, Ohio, assignor to Toledo Scale Company, Toledo, Ohio, a corporation of New Jersey Application December 24, 1942, Serial No. 470,085

1 Claim. (Cl. 265—49)

This invention relates to poises for movement along a weighing scale beam and more particularly to a poise constructed in such a manner as to eliminate an expensive heretofore necessary machining operation.

Poises for use on weighing scale beams are usually constructed of hollow castings in which lead or other heavy material is placed in a specific weighed quantity so that the load of the poise will counterbalance specific weights of the scale when placed at various positions along its beam.

Because it is necessary to slide the poises along the beam the poises often are constructed of two halves, being divided along a vertical plane with the opening through which the beam passes lying immediately adjacent such plane. Because the two halves of the poise are cast or machined separately it has been difficult to insure a perfect match between their surfaces. Poises so constructed usually require a final grinding operation to match up their surfaces and give them a finished appearance.

It is an object of this invention to provide a weighing scale poise which does not require this final machining operation and yet which will present a finished attractive exterior.

More specific objects and advantages are apparent from the description, in which reference is had to the accompanying drawing illustrating a preferred form of poise embodying the invention.

In the drawing:

Fig. I is a view in perspective of a poise embodying the invention.

Fig. II is a vertical sectional view taken substantially on the line II—II of Fig. I.

Fig. III is a fragmentary view taken substantially along the line III—III of Fig. II.

The specific drawing and the specific description that follows merely disclose and illustrate the invention and are not intended to impose limitations upon the claim.

A poise embodying the invention may be constructed of a front half 10 and a rear half 11 which are lined up, one with the other, by means of a pair of pins 12 mounted in drilled aligning holes 13 and which are secured together by means of machine screws 14. The front half of the poise has an opening 15 through which indicia 16 scribed on a beam 17 are visible. The beam 17 extends through a slot formed in the ends of the front half 10 and bordered on three sides by such ends and on the fourth side by the edge of the rear half 11. A dog 18 may be secured to the interior of the front half 10 for cooperation with a plurality of notches 19 in the upper surface of the beam 17 to hold the poise in position on the beam.

A band of integrally cast material 20 is formed around the front edge of the rear half of the poise. The provision of this band or lip obviates the careful machining of the exterior surfaces which always has been necessary, because when it is employed any slight irregularities in such surfaces are not glaringly apparent to the user, thus effecting a substantial saving in manufacturing costs.

The embodiment of the invention that has been disclosed may be modified to meet various requirements.

Having described my invention, I claim:

In a weighing scale poise comprising two parts separable along a median plane and having generally flat surfaces subject to irregularities adjacent the dividing plane, means for concealing the mismatch of said parts consisting of a raised peripheral bead on one of said parts along the edge adjacent the dividing plane, said means allowing the production of an acceptable poise from randomly selected parts without a dressing operation following assembly.

NORMAN E. HART.